A1

United States Patent
Venugopal et al.

(10) Patent No.: US 11,093,358 B2
(45) Date of Patent: Aug. 17, 2021

(54) METHODS AND SYSTEMS FOR PROACTIVE MANAGEMENT OF NODE FAILURE IN DISTRIBUTED COMPUTING SYSTEMS

(71) Applicant: INTERNATIONAL BUSINESS MACHINES CORPORATION, Armonk, NY (US)

(72) Inventors: Srikumar Venugopal, Dublin (IE); Christian Pinto, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/601,456

(22) Filed: Oct. 14, 2019

(65) Prior Publication Data

US 2021/0109830 A1 Apr. 15, 2021

(51) Int. Cl.
| | |
|---|---|
| *G06F 15/16* | (2006.01) |
| *G06F 11/263* | (2006.01) |
| *G06F 11/22* | (2006.01) |
| *G06F 9/50* | (2006.01) |
| *G06F 11/14* | (2006.01) |
| *H04L 29/08* | (2006.01) |

(52) U.S. Cl.
CPC .......... *G06F 11/263* (2013.01); *G06F 9/5072* (2013.01); *G06F 11/1438* (2013.01); *G06F 11/2242* (2013.01); *H04L 67/10* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 8,140,914 B2 | 3/2012 | Murphy | |
| 8,560,889 B2 | 10/2013 | Behrendt et al. | |
| 9,009,521 B2 | 4/2015 | Rajkumar | |
| 9,208,007 B2 | 12/2015 | Harper et al. | |
| 9,250,974 B1 | 2/2016 | Estes et al. | |
| 9,323,636 B2 | 4/2016 | Xia et al. | |
| 9,348,710 B2 | 5/2016 | Al-Wahabi | |
| 10,030,797 B2 | 6/2018 | Korus et al. | |
| 10,061,652 B2 | 8/2018 | Johnson et al. | |
| 10,255,153 B2 | 4/2019 | Ganapathy et al. | |
| 10,387,214 B1 * | 8/2019 | Christian | G06N 20/00 |

(Continued)

OTHER PUBLICATIONS

"Online Failure Prediction for HPC Resources using Decentralized Clustering," Pelaez et al., 2014 21st International Conference on High Performance Computing (HiPC), IEEE, (9 Pages).

(Continued)

*Primary Examiner* — Phyllis A Book
(74) *Attorney, Agent, or Firm* — Griffiths & Seaton PLLC

(57) ABSTRACT

Embodiments for managing distributed computing systems are provided. Information associated with operation of a computing node within a distributed computing system is collected. A reliability score for the computing node is calculated based on the collected information. The calculating of the reliability score is performed utilizing the computing node. A remedial action associated with the operation of the computing node is caused to be performed based on the calculated reliability score.

21 Claims, 6 Drawing Sheets

(56) References Cited

U.S. PATENT DOCUMENTS

| | | | |
|---|---|---|---|
| 2004/0153709 A1 | 8/2004 | Burton-Krahn | |
| 2007/0067663 A1 | 3/2007 | Surasinghe | |
| 2016/0034362 A1* | 2/2016 | Al-Wahabi | G06F 11/1461 714/4.1 |
| 2017/0230306 A1* | 8/2017 | Cropper | G06F 9/5083 |
| 2017/0359243 A1* | 12/2017 | Deuri | H04L 45/74 |
| 2018/0020045 A1* | 1/2018 | Cook | G06F 9/4494 |
| 2019/0171438 A1* | 6/2019 | Franchitti | G06F 16/9538 |
| 2019/0196920 A1* | 6/2019 | Andrade Costa | G06F 11/1438 |
| 2019/0213046 A1* | 7/2019 | Matus | G06F 9/5061 |
| 2019/0377625 A1* | 12/2019 | Chintalapati | G06F 9/45558 |

OTHER PUBLICATIONS

Javed, K. Heljanko, A. Buda, and K. Främling, "CEFIoT: A fault-tolerant IoT architecture for edge and cloud," in 2018 IEEE 4th World Forum on Internet of Things (WF-IoT), 2018, pp. 813-818. & Pages).

M. Ryden, K. Oh, A. Chandra, and J. Weissman, "Nebula: Distributed Edge Cloud for Data Intensive Computing," in 2014 IEEE International Conference on Cloud Engineering, 2014, pp. 57-66. (14 Pages).

Y. Xiong, Y. Sun, L. Xing, and Y. Huang, "Extend Cloud to Edge with KubeEdge," in 2018 IEEE/ACM Symposium on Edge Computing (SEC), Seattle, WA, USA, 2018, pp. 373-377.

* cited by examiner

METHODS AND SYSTEMS FOR PROACTIVE MANAGEMENT OF NODE FAILURE IN DISTRIBUTED COMPUTING SYSTEMS

BACKGROUND OF THE INVENTION

The project leading to this application has received funding from the European Union's Horizon 2020 research and innovation programme under grant agreement No. 688540.

FIELD OF THE INVENTION

The present invention relates in general to computing systems, and more particularly, to various embodiments for proactive management of node failures in distributed computing systems.

DESCRIPTION OF THE RELATED ART

Generally, distributing computing (or distributed computing systems) refers to computing systems (e.g., cloud systems, "edge" systems, etc.) that include multiple components (e.g., nodes, microservices, containers, etc.) that are implemented on different networked computing devices that coordinate their actions by sending various types of communications (e.g., requests, data, etc.) to one another. Often, this activity is performed in order to achieve a common goal (i.e., the components are working together to jointly perform a functionality or task). For example, the components (e.g., nodes) may jointly run a distributed program. The implementation of such systems is becoming increasingly common as many organizations (e.g., companies, service providers, etc.) are transitioning from monolithic applications towards utilizing multiple microservices and packaged containers.

In such systems, node failure is sometimes managed (or handled) in the application layer utilizing, for example, state machine replication and "checkpointing." That is, in order to safeguard against failures, applications often store their current or most recent "state" in a persistent (and perhaps centralized) database. However, most current solutions to node failure are performed "reactively" (e.g., when a node fails, an attempt is made to restart the application on other nodes from their saved state). Additionally, although node failure may be predicted utilizing data from various sources (e.g., hard disks, RAM, processors, etc.), which could be used to migrate applications (and/or data) to other nodes, no current centralized systems are sufficiently agile and/or powerful to process signals from, potentially, thousands of nodes.

SUMMARY OF THE INVENTION

Various embodiments for managing distributed computing systems, by one or more processors, are provided. Information associated with operation of a computing node within a distributed computing system is collected. A reliability score for the computing node is calculated based on the collected information. The calculating of the reliability score is performed utilizing the computing node. A remedial action associated with the operation of the computing node is caused to be performed based on the calculated reliability score.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
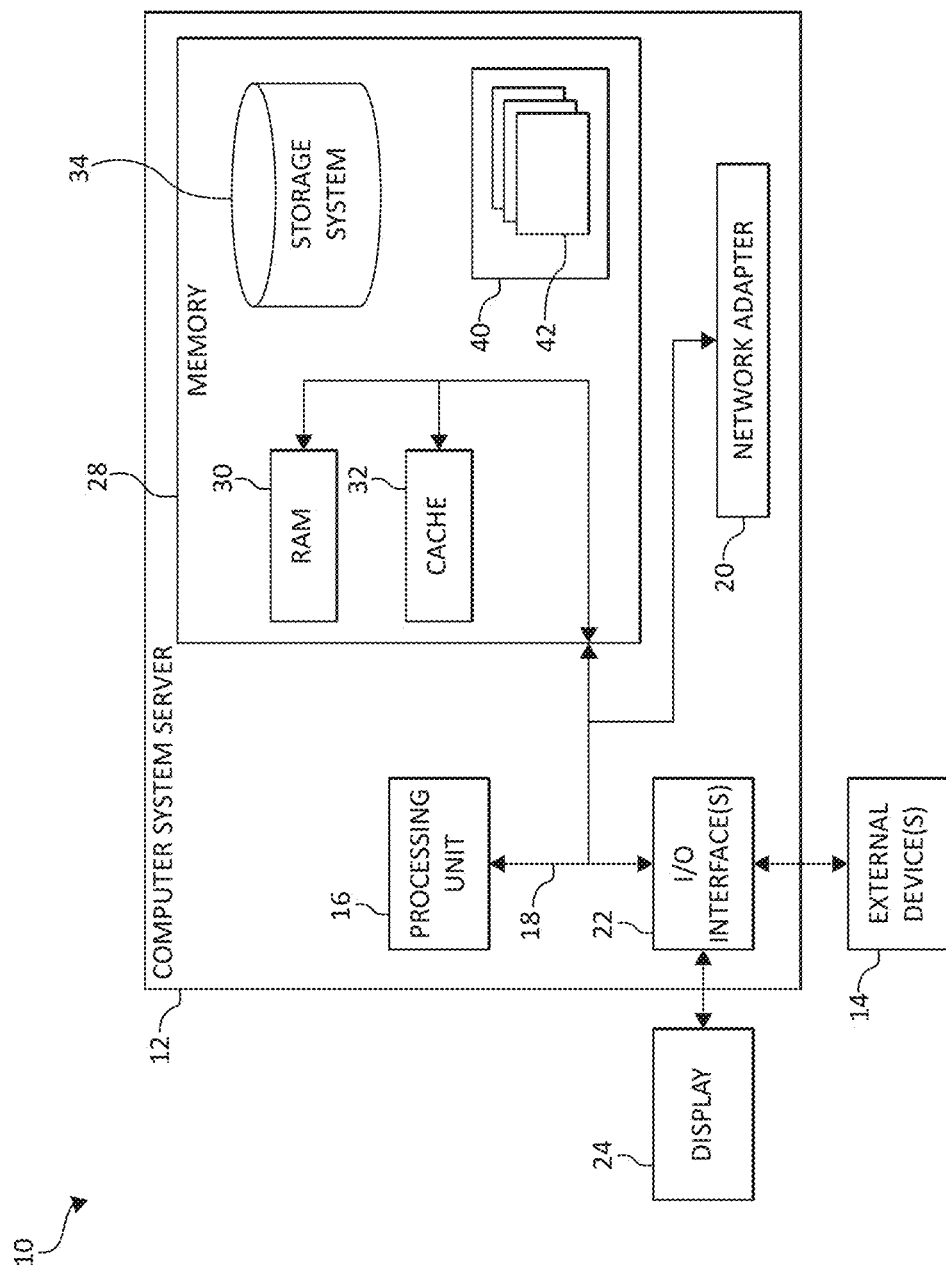
FIG. 1 is a block diagram depicting an exemplary computing node according to an embodiment of the present invention.

As discussed above, distributing computing (or distributed computing systems) refers to computing systems (e.g., cloud systems, "edge" systems, etc.) that include multiple components (e.g., nodes, microservices, containers, etc.) that are implemented on different networked computing devices that coordinate their actions by sending various types of communications (e.g., requests, data, etc.) to one another. Often, this activity is performed in order to achieve a common goal (i.e., the components are working together to jointly perform a functionality or task). For example, the components (e.g., nodes) may jointly run a distributed program. The implementation of such systems is becoming increasingly common as many organizations (e.g., companies, service providers, etc.) are transitioning from monolithic applications towards utilizing multiple microservices and packaged containers.

In such systems, node failure is sometimes managed (or handled) in the application layer utilizing, for example, state machine replication and "checkpointing." That is, in order to safeguard against failures, applications often store their current or most recent "state" in a persistent (and perhaps centralized) database. However, most current solutions to node failure are performed "reactively" (e.g., when a node fails, an attempt is made to restart the application on other nodes from their saved state). Additionally, although node failure may be predicted utilizing data from various sources (e.g., hard disks, RAM, processors, etc.), which could be used to migrate applications (and/or data) to other nodes, no current centralized systems are sufficiently agile and/or powerful to process signals from, potentially, thousands of nodes.

As such, there is a need for decentralized mechanisms (e.g., residing on individual nodes), which are able to proactively take actions to help applications (or other computing system tasks, programs, etc.) deal with (imminent) node failure. Such a system may be especially useful in distributed systems in which a centralized system may take a significant amount of time to react to the failure of nodes, such as in wide area networks (e.g. the Internet, local area networks (LANs), etc.).

To address these needs, some embodiments described herein provide methods and systems for managing node failure (or potential node failure) in distributed computing systems in, for example, an event-driven, decentralized manner. In some embodiments, a reliability score (or grade or state) is calculated or determined for nodes (e.g., each node) in the system(s). Based on the calculated score(s) (and/or the determined state of the node(s)), a remedial action associated with the operation of the node(s) is performed. For example, a computing task (or the performing thereof), such as the running or operation of an application or a portion thereof, may be migrated from one node in the system to another node in the system (e.g., from an "unreliable" node to a "reliable" node) or restarted on another node in the system, perhaps before the first node fails.

In some embodiments, at least some of the functionality described herein (e.g., the calculating of the reliability score(s)) is performed in a decentralized manner. For example, the nodes may "self-diagnose" such that if the nodes determine that there is a relatively high probability that they will fail within a predetermined amount of time, or more generally, the calculated reliability score exceeds (or fails to exceed) a predetermined threshold, the nodes may cause a remedial action to be performed (and/or perform such an action). For example, tasks may be migrated to other nodes, tasks may be restarted on other nodes, the particular (unreliable) node may be restarted, tasks may be "checkpointed" (e.g., the current/most recent state may be saved in a centralized database), etc.

In some embodiments, each node of the system includes a node manager and a predictor. It should be understood that in some embodiments, the functionality performed by the node manager and/or the predictor, perhaps along with other functionality described herein, may be performed utilizing (or by) nodes within a distributed computing system (i.e., in a decentralized manner).

The node manager may incorporate (or utilize) an event-driven finite state machine to manage (or describe, encapsulate, etc.) node lifecycles or failures. The predictor may provide forecast of node conditions (or calculate/determine node reliability scores/grades) in order to provide warnings of potential (and/or imminent) failures to the node manager. In some embodiments, a resource allocator or scheduler (e.g., centralized or decentralized) may also be included, which may provide healthy or reliable alternative nodes to which tasks may be migrated (e.g., when one node is determined to be unreliable/unhealthy, in case of node failure, etc.).

In some embodiments, the state machine encapsulates the node (or failure) lifecycle in which the node(s) transitions (or are determined to transition) between three states (or statuses): "reliable," "unreliable," and "unavailable." In some embodiments, a fourth state of "available" may also be included/utilized for nodes that recently began operation, (re)joined the network, etc. In the reliable state, the node (e.g., a server) may be determined to be operating normally, as intended, etc. In the unreliable state, the node may be properly communicating with other nodes and able to start and performs tasks, but there is a (relatively) high probability that the node will fail within a predetermined amount of time (and/or the calculated reliability score thereof has exceeded a predetermined threshold). In the unavailable state, the node may not be able to be contacted due to, for example, a system crash (or node failure) or a network partition. In some embodiments, when nodes begin operating (or utilized), they are initial determined (or considered) to be in the available or reliable state if there no previous data or history associated with the node.

System monitoring data (e.g., related to the operation of hard disks, RAM, processors, etc., such as fault/error counts or frequencies) is sent to (or retrieved by, collected by, monitored by, etc.) the predictor, which predicts the probability that the node will fail (and/or calculates a reliability score for the node). More specifically, in some embodiments, the predictor predicts the probability that the node will fail within a predetermined amount of time or time horizon (e.g., five minutes, ten minutes, etc.), which may be a configurable setting. The forecast (or reliability score) may be provided to a risk evaluator, which may determine if the node should transition (or be transitioned) to the unreliable state or remain in the reliable state.

The risk evaluator may utilize a simple threshold-based approach (e.g., with respect to calculated reliability scores, probabilities of failure, etc.) to determine if the state of the node should be changed. However, as another example, the risk evaluator may solve a partially observable Markov decision process (POMDP), as is commonly understood. Also, the risk evaluator may utilize a cognitive analysis or machine learning technique, such as reinforcement learning, to choose (or change) the state based on a reward function.

The node manager may change the state of the node(s) to drive the operation of the system, which may include, for example, migrating applications (or other tasks, data, etc.) from one node to other, healthy (or reliable) nodes or restarting applications on other, healthy nodes. The healthy nodes may be determined (or discovered, selected, etc.) via a peer discovery process or may be suggested by a central resource manager or scheduler (i.e., which stores data related to the states/reliability of the other nodes). In some embodiments, only particular applications (e.g., high priority applications) are migrated between nodes, while other applications (e.g., low priority applications) may only receive a notification (e.g., that the respective node has been determined to be unreliable, about to fail, etc.). In some situations, the node manager may proactively set the state (i.e., of the respective node) to unavailable. In such an occurrence, the scheduler may not migrate or allocate any applications to that node.

In some embodiments, if a node fails before transitioning to the unavailable state, the state (or status) of the node may be set to unavailable in a central database (e.g., by the resource manager). When a node rejoins the network/system (or again becomes available), the state of the node may be set to unreliable for a predetermined amount of time (e.g., an observation period).

The information about the state of the nodes may be used to drive other functions of the infrastructure (or distributed computing system), such as periodic node maintenance and/or reconfiguration. The resource manager may utilize the information about the node state, periodically stored in the database, to determine the allocation of new incoming applications by, for example, scheduling revenue-generating applications (or otherwise high priority applications) to only reliable nodes or to use unreliable nodes for low priority applications, such as batch processing.

As such, the node manager, the predictor, and/or the risk evaluator (and/or a particular node in general) may be considered to calculate a reliability score (or grade, state, status, etc.) with respect to the particular (or a first) node. Although some embodiments described herein reference "states" of the nodes (e.g., reliable, unreliable, etc.), it should be understood that in other embodiments, the reliability score may be calculated as a numeric value (e.g., on any scale, positive or negative, with higher values being indicative of higher reliability, or vice versa). The reliability score may be used to determine whether or not a remedial action associated with the operation of the node should be performed, such as migrating one or more task being performed by the particular node to another node or restarting the task(s) on another node. In such instances, the second node may be selected based on the similarly calculated reliability scores of other available nodes in the system (i.e., each node may operate in a similar manner such that each self-diagnoses by determining its own reliability score).

In some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, managing distributed computing systems and/or the calculating of reliability scores for nodes as described herein. Utilizing the models, the performance (or operation) of the system (e.g., utilizing/based on new inputs) may be predicted and/or the performance of the system may be optimized by investigating how changes in the input(s) effect the output(s). In some embodiments, feedback from users may be received (or detected) and utilized, allowing for the performance of the system to improve with continued use.

It should be understood that as used herein, the term "computing node" (or simply "node") may refer to, for example, a physical computing device or virtual computing device (or virtual machine) that is capable of running one or more applications.

In particular, in some embodiments, a method for managing a distributed computing system, by one or more processors, is provided. Information associated with operation of a computing node within a distributed computing system is collected. A reliability score for the computing node is calculated based on the collected information. The calculating of the reliability score is performed utilizing the computing node. A remedial action associated with the operation of the computing node is caused to be performed based on the calculated reliability score.

The distributed computing system may include a plurality of computing nodes. The causing of the remedial action to be performed may include, for example, causing a computing task to be migrated from the computing node to a second computing node within the distributed computing system, causing a computing task being performed by the computing node to be restarted on a second computing node within the distributed computing system, causing a state of a computing task being performed by the computing node to be saved, and/or causing the computing node to be restarted.

For example, the causing of the remedial action to be performed may include causing a computing task to be migrated from the computing node to a second computing node within the distributed computing system. In such instances, the causing of the computing task to be migrated from the computing node to the second computing node may include calculating a reliability score for each of the second computing node and others of the plurality of computing nodes in the distributed computing system and selecting the second computing node based on the respective calculated reliability scores for the second computing node and the others of the plurality of computing nodes.

The calculating of the reliability score for the computing node may include calculating a probability of the computing node failing within a predetermined amount of time. The causing of the remedial action associated with the operation of the computing node to be performed may be initiated while the computing node is performing a computing task.

The calculating of the reliability score for the computing node may be performed utilizing a cognitive analysis. The information associated with the operation of the computing node may be associated with at least one of processor faults of the computing node and memory faults of the computing node.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
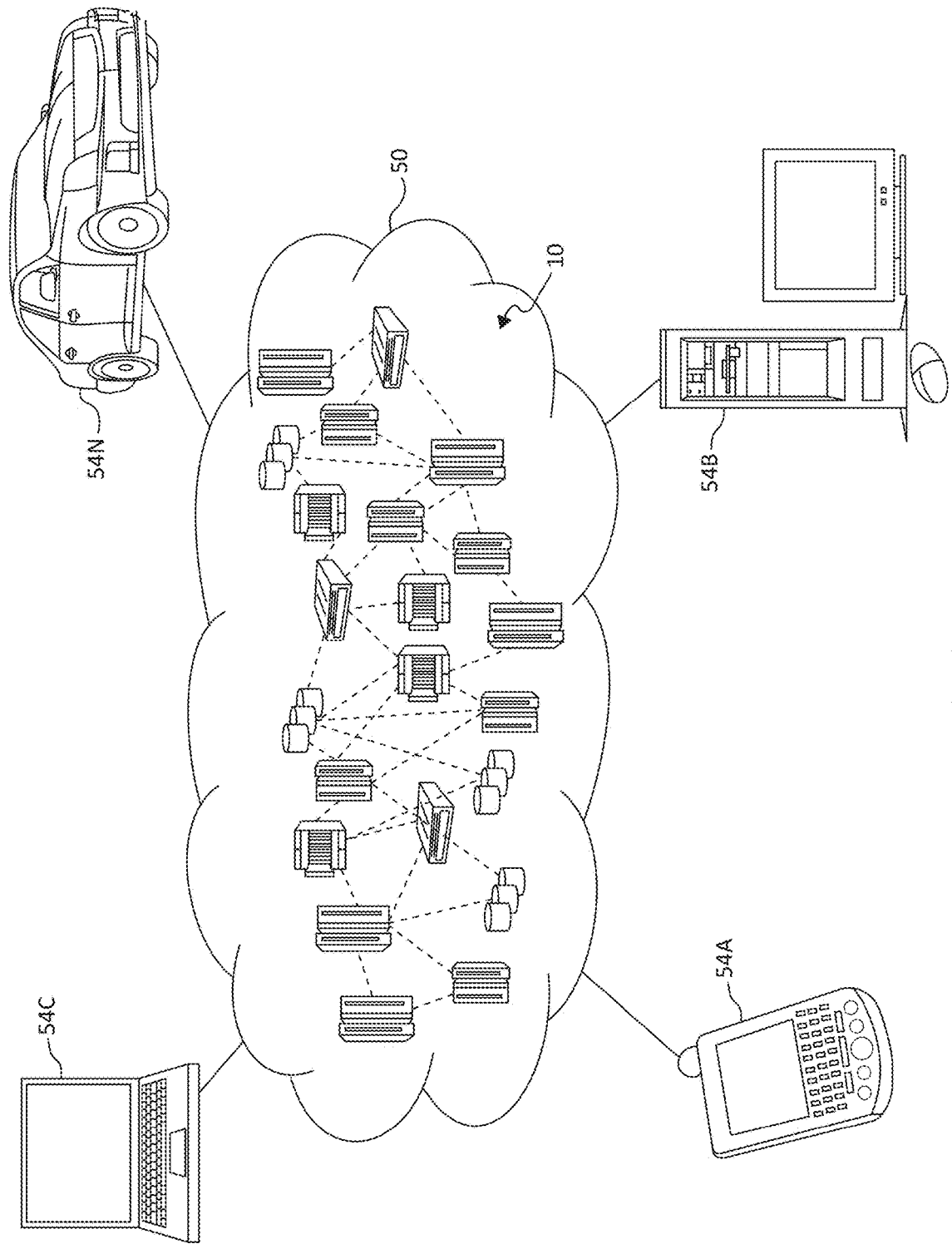
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N, may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
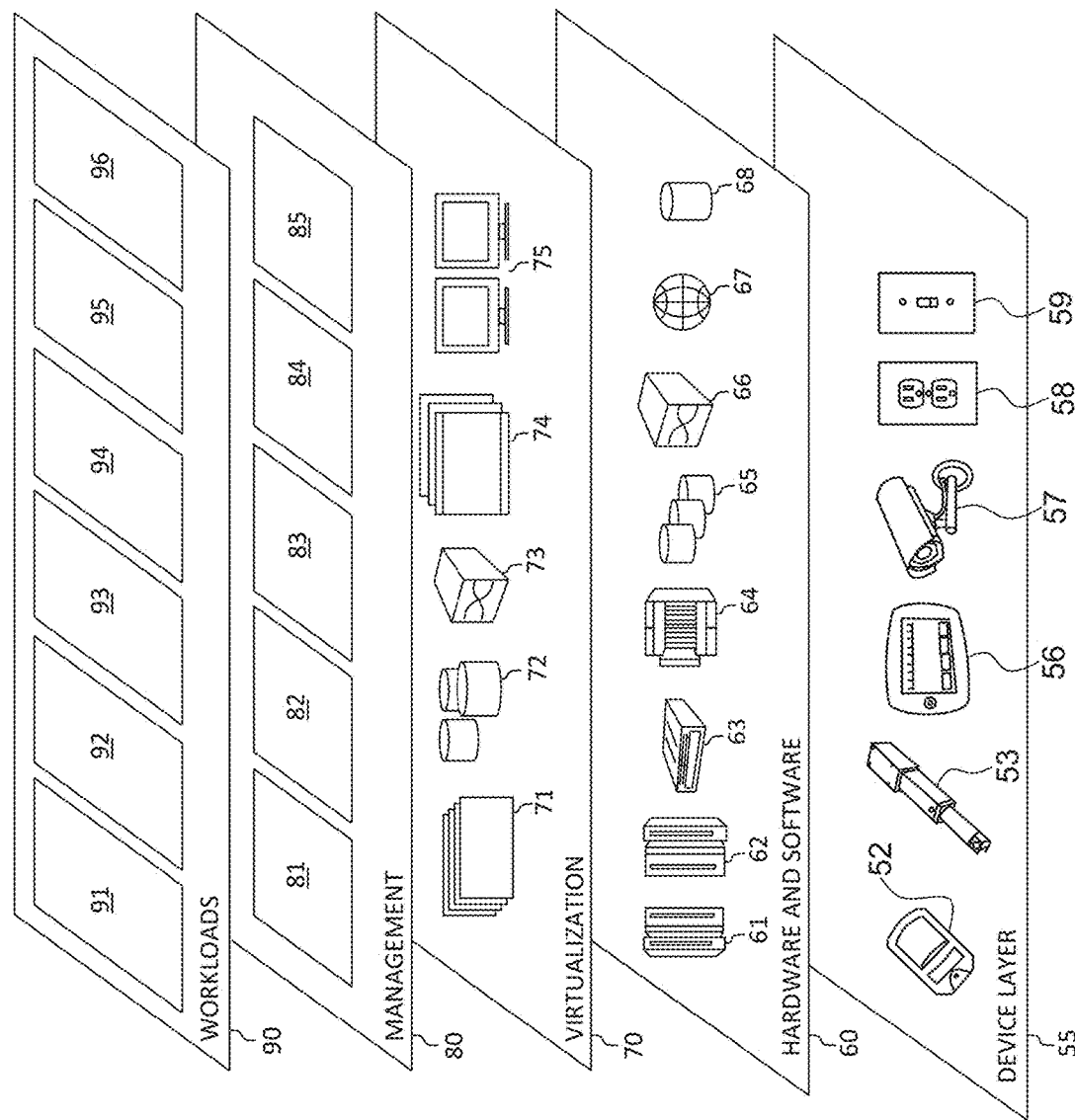
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing distributed computing systems as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and systems for managing node failure (or potential node failure) in distributed computing systems (or managing distributed computing systems or networks) are provided. In some embodiments, a reliability score (or grade or state) is calculated or determined for nodes in the system (e.g., each node in the system). Based on the calculated score(s) (and/or the determined state of the node(s)), a remedial action associated with the operation of the node(s) is performed. For example, tasks may be migrated to other nodes (e.g., from an "unreliable" node to a "reliable" node), tasks may be restarted on other nodes, the particular (unreliable) node may be restarted, tasks may be "checkpointed," etc., perhaps before the first node fails. In some embodiments, at least some of the functionality described herein (e.g., the calculating of the reliability score(s)) is performed in a decentralized manner. For example, the nodes may "self-diagnose" such that if the nodes determine that there is a relatively high probability that they will fail within a predetermined amount of time, or more generally, the calculated reliability score exceeds (or fails to exceed) a predetermined threshold, the nodes may cause an appropriate remedial action to be performed (and/or perform such an action).

Figure 4:
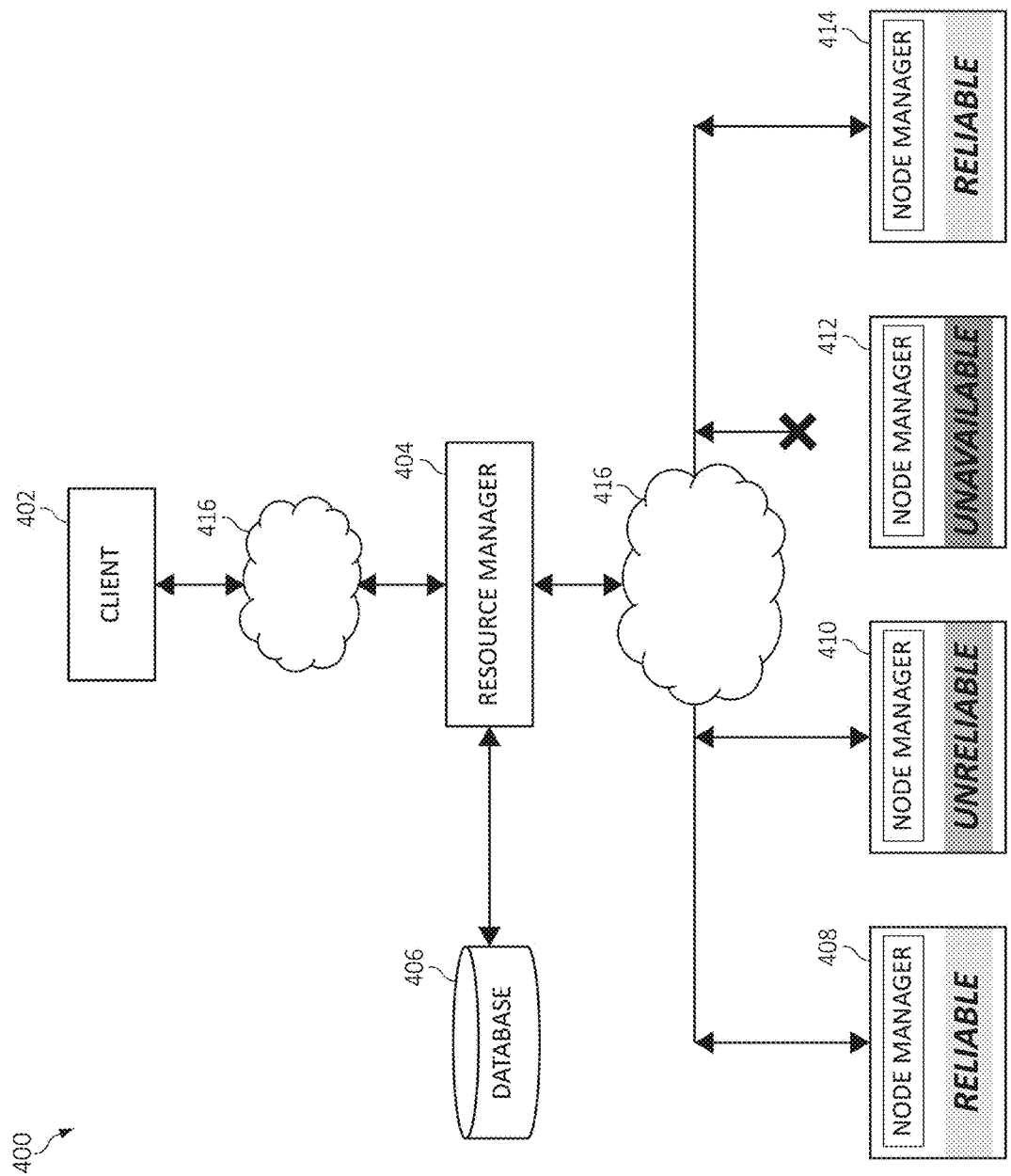
FIG. 4 is a block diagram of a distributed computing system according to an embodiment of the present invention.

FIG. 4 illustrates an exemplary computing environment (e.g., a distributed computing system) 400 according to an embodiment of the present invention. As shown, the system includes a client 402, a resource manager 404, a database 406, and nodes 408-414, which are in operable communication as shown via network infrastructure 416 (e.g., a communications network, the "cloud," the Internet, etc.). Each of the components shown in FIG. 4 may be implemented utilizing any suitable computing device, such as those described above. It should be understood that in some embodiments distributed computing systems in which the methods/systems described herein are utilized include other components (e.g., hundreds, thousands, etc. nodes).

The client 402 may include a computing node through which a user (e.g., an individual or automated system) is interacting with the distributed computing system 400 (e.g., utilizing the nodes 408-414 to run a distributed application or program). As described above, the resource manager (or scheduler) receives information from each of the nodes 408-414, such as their current or most recent state (e.g., as determined by the node manager of each of the nodes 408-414), which is stored in the database 406.

In the example shown, nodes 408 and 414 are in (or have been determined to be in) the reliable state, node 410 is in the unreliable state, and node 412 is in the unavailable state. In other words, as described above, nodes 408 and 414 have been determined to be working as intended and/or the reliability scores thereof exceed (or are below) a predetermined threshold that is indicative of a "healthy" or "reliable" node. More particularly, in some embodiments, nodes 408 and 414 have determined that is it relatively unlikely (e.g., less than or equal to a 30% probability) that they will fail within a predetermined amount of time (e.g., five minutes), resulting in the node managers thereof maintaining nodes 408 and 414 in the reliable state. As also shown in FIG. 4, node 410 is in the unreliable state, and node 412 is in the unavailable state. In other words, as described above, the reliability score of node 410 has been determined to be indicative of an unhealthy or unreliable node. More particularly, in some embodiments, node 410 has determined that it is relatively likely (e.g., greater than a 30% probability) that it will fail within the predetermined amount of time, resulting in the node manager thereof transitioning node 410 to the unreliable state. As described above, node 412 being in the unavailable state may be indicative that node 412 has already failed (or crashed) and/or otherwise can not be contacted.

In a manner similar to that described above, based on the states of the nodes 408-414, in particular node 410, one or more remedial action may be taken. For example, computing tasks may be migrated from unhealthy (or unreliable) nodes to healthy (or reliable nodes) or restarted on healthy/reliable nodes. As such, still referring to FIG. 4, a computing task being performed by node 410 may be migrated to (or restarted on), for example, node 408 or node 414. For example, if node 410 is running a distributed program (or a portion thereof), the task may be migrated to node 408 or node 414. The migration of the task to node 408 or node 414 (or another remedial action) may be initiated while node 410 is performing the task (e.g., while node 410 is still essentially functioning properly).

The selection of the node to which the task(s) is migrated (and/or on which the task(s) is restarted) may be performed by the resource manager 404. More particularly, in some embodiments, when node 410 transitions to the unreliable state, node 410 may send a request to the resource manager 404 for a list of healthy/reliable nodes. Based on the information received from the nodes (e.g., nodes 408-414) and stored on the database 406, the resource manager 404 may reply with a list of candidate nodes. However, in some embodiments, this process may be performed without the resource manager 404 (e.g., a resource manager or other centralized component may not be included/utilized). Rather, node 410 may send a request to nodes 408, 412, and 414 for their current states (e.g., a peer discovery process), and selected from the nodes in the appropriate state (e.g., reliable), perhaps in combination with other information (e.g., resources or bandwidth available).

Figure 5:
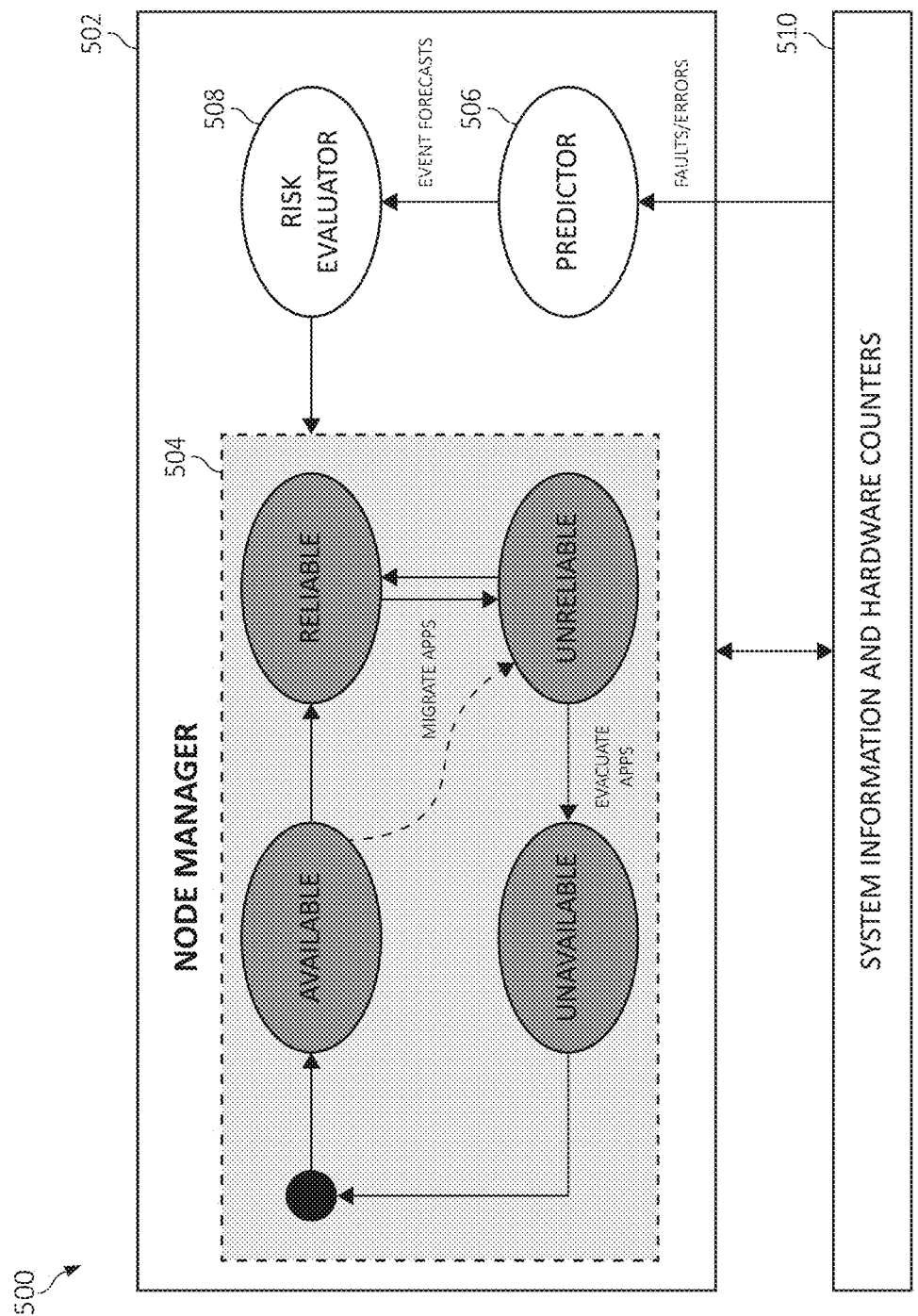
FIG. 5 is a block diagram of a distributed computing system node according to an embodiment of the present invention.

FIG. 5 is a simplified illustration of a distributed computing system node 500 (or a portion thereof) according to an embodiment of the present invention. The node 500 includes a computer (or compute) manager 502, which includes a node manager 504, a predictor 506, and a risk evaluator 508. The node manager 504 may include (or utilize) an event-driven finite state machine. In the example shown, the state machine includes four states: available, reliable, unreliable, and unavailable, as described above. The computer manager 502 may constantly poll the system, or system information and hardware counters 510 in FIG. 5, through a hypervisor for information about the CPU, memory, hard disks, etc. (e.g., faults, errors, fault/error counts, fault/error frequencies, etc.), which is provided to the predictor 506.

The predictor 506 may implement, for example, a, ordinary least squares (OLS) regression model over a moving average of the error magnitude. The predictor 506 may provide an event forecast, or more particularly, the probability that the node 500 will fail within a predetermined amount of time (e.g., five minutes). The probability may be derived from, for example, historical data on failures of system components for similar nodes and/or may be updated based on real-time data.

The probability (or event forecast(s)) may be sent to the risk evaluator 508. The risk evaluator 508 may be (or utilize) a threshold-based decision policy, which is utilized by the node manager 504 to transition between the states. For example, if the forecast (or probability) is higher than a threshold (e.g. a configurable threshold), the node manager 504 transitions the state of the node 500 from the reliable (or available) state to the unreliable state. However, in other embodiments, different techniques, such as reinforcement learning, may be utilized to determine the current state based on the previous state and a reward function, as will be appreciated by one skilled in the art.

In some embodiments, only high priority tasks (e.g., programs, virtual machines, etc.), which may be determined based on a user's profile, are queued to be migrated to (and/or restarted on) more reliable nodes. The migration of tasks may be performed utilizing known live migration application programs interfaces (APIs). In some embodiments, the node may send a signal to the scheduler (or resource manager or other central system) and allow the scheduler to take the correct action.

In some embodiments, when the predictor forecasts a particularly high probability of failure (and/or calculated reliability score exceeds a particular threshold), the node is transitioned to the unavailable state (e.g., without being first transitioned to the unreliable state). When a node becomes unavailable, tasks that were (and/or are) being performed by the node may be migrated (or evacuated) to other reliable nodes (and/or restarted on other reliable nodes). Such a process may utilize saved states of tasks (e.g., applications) which may be stored in a central database.

When a node is brought back to the available state (e.g., after failing/being disabled for maintenance and being repaired), the node may be initially set to the unreliable state due to its previous history (e.g., at least for a predetermined amount of time, such as several hours, a few days, etc.). In such instances, no high priority tasks may be scheduled on and/or migrated to the node until its state is returned to reliable (e.g. after operating for the predetermined amount of time, or "probationary" period, and reported as not generating any errors/faults or a relatively low number of errors/faults).

Figure 6:
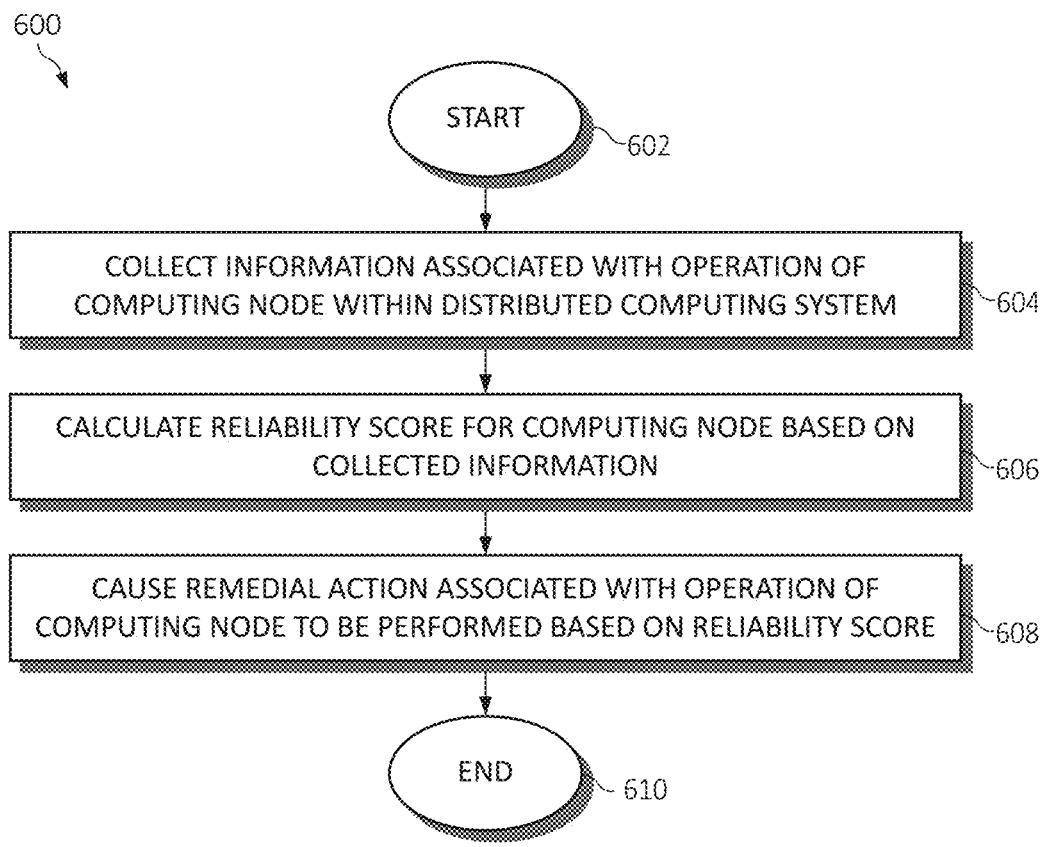
FIG. 6 is a flowchart diagram of an exemplary method for managing a distributed computing system according to an embodiment of the present invention.

Turning to FIG. 6, a flowchart diagram of an exemplary method 600 for managing a distributed computing system, in accordance with various aspects of the present invention, is provided. Method 600 begins (step 602) with, for example, a distributed computing system being implemented utilizing a plurality of computing components or nodes (e.g., via a communications network, the Internet, etc.).

Information associated with operation of a computing node within the distributed computing system is collected (or received, monitored, etc.) (step 604). The information associated with the operation of the computing node may be associated with (and/or include) at least one of processor faults of the computing node and memory faults of the computing node (e.g., error/fault counts, frequencies, etc. of a processor, hard disk, RAM, etc.).

A reliability score for the computing node is calculated based on the collected information (step 606). The calculating of the reliability score may be performed utilizing the computing node (e.g., the computing node may "self-diagnose"). The calculating of the reliability score for the computing node may include calculating a probability of the computing node failing within a predetermined amount of time (e.g., five minutes, ten minutes, etc.) and/or be performed utilizing a cognitive analysis.

A remedial action associated with the operation of the computing node is caused to be performed based on the calculated reliability score (step 608). The causing of the remedial action to be performed may include, for example, causing a computing task to be migrated from the (first) computing node to a second computing node within the distributed computing system, causing a computing task being performed by the computing node to be restarted on a second computing node within the distributed computing system, causing a state of a computing task being performed by the computing node to be saved (e.g., a "checkpointing" process), and/or causing the computing node to be restarted. For example, if the reliability score calculated for the (first) computing node (and/or the probability that the first computing node will fail within the predetermined amount of time) exceeds (or fails to exceed) a predetermined threshold, a computing task (e.g., running a distributed program or a portion thereof) may be migrated to a second computing node within the distributed computing system.

In embodiments in which a computing task is migrated to (or restarted on) a second computing node within the distributed computing system, the causing of the computing task to be migrated (or restarted) may include calculating a reliability score for each of the second computing node and others of the plurality of computing nodes in the distributed computing system (each of which may "self-diagnose" in a manner similar to the first computing node). The second computing node may be selected based on the respective calculated reliability scores for the second computing node and the others of the plurality of computing nodes. The causing of the remedial action associated with the operation of the computing node to be performed may be initiated while the computing node is performing a computing task.

Method 600 ends (step 610) with, for example, the remedial action being completed, such as a migrated task being performed by a second computing node. The process may then be repeated (e.g., for the second computing node and/or other computing nodes in the system). In some embodiments, a user(s) may provide feedback, which may be utilized by the system to improve performance over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing a distributed computing system, by a processor, comprising:

collecting information associated with operation of a computing node of a plurality of computing nodes within a distributed computing system;

calculating, by the computing node, a reliability score indicative of a node status for the computing node based on the collected information, wherein the calculating of the reliability score is decentralized in that each of the plurality of computing nodes within the distributed computing system computes a respective reliability score corresponding each thereto;

storing the node status and the calculated reliability score for each of the plurality of computing nodes within the distributed computing system in a centralized database; and causing a remedial action associated with the operation of the computing node to be performed based on said calculated reliability score, wherein an initial allocation of those of the plurality of computing nodes assigned to perform an incoming application having a defined priority is determined by a resource manager according to the node status and the calculated reliability score of those of the plurality of nodes identified by the resource manager from the centralized database.

2. The method of claim 1, wherein the causing of the remedial action to be performed includes at least one of causing a computing task to be migrated from the computing node to a second computing node within the distributed computing system, causing a computing task being performed by the computing node to be restarted on a second computing node within the distributed computing system, causing a state of a computing task being performed by the computing node to be saved, and causing the computing node to be restarted.

3. The method of claim 2, wherein the causing of the remedial action to be performed includes causing a computing task to be migrated from the computing node to a second computing node within the distributed computing system, and wherein the causing of the computing task to be migrated from the computing node to the second computing node includes calculating a reliability score for each of the second computing node and others of the plurality of computing nodes in the distributed computing system and selecting the second computing node based on the respective calculated reliability scores for the second computing node and the others of the plurality of computing nodes.

4. The method of claim 1, wherein the calculating of the reliability score for the computing node includes calculating a probability of the computing node failing within a predetermined amount of time.

5. The method of claim 1, wherein the causing of the remedial action associated with the operation of the computing node to be performed is initiated while the computing node is performing a computing task.

6. The method of claim 1, wherein the calculating of the reliability score for the computing node is performed utilizing a cognitive analysis.

7. The method of claim 1, wherein the information associated with the operation of the computing node is associated with at least one of processor faults of the computing node and memory faults of the computing node.

8. A system for managing a distributed computing system comprising:

a processor executing instructions stored in a memory device, wherein the processor:

collects information associated with operation of a computing node of a plurality of computing nodes within a distributed computing system;

calculates, by the computing node, a reliability score indicative of a node status for the computing node based on the collected information, wherein the calculating of the reliability score is decentralized in that each of the plurality of computing nodes within the distributed computing system computes a respective reliability score corresponding each thereto;

stores the node status and the calculated reliability score for each of the plurality of computing nodes within the distributed computing system in a centralized database; and causes a remedial action associated with the operation of the computing node to be performed based on said calculated reliability score, wherein an initial allocation of those of the plurality of computing nodes assigned to perform an incoming application having a defined priority is determined by a resource manager according to the node status and the calculated reliability score of those of the plurality of nodes identified by the resource manager from the centralized database.

9. The system of claim 8, wherein the causing of the remedial action to be performed includes at least one of causing a computing task to be migrated from the computing node to a second computing node within the distributed computing system, causing a computing task being performed by the computing node to be restarted on a second computing node within the distributed computing system, causing a state of a computing task being performed by the computing node to be saved, and causing the computing node to be restarted.

10. The system of claim 9, wherein the causing of the remedial action to be performed includes causing a computing task to be migrated from the computing node to a second computing node within the distributed computing system, and wherein the causing of the computing task to be migrated from the computing node to the second computing node includes calculating a reliability score for each of the second computing node and others of the plurality of computing nodes in the distributed computing system and selecting the second computing node based on the respective calculated reliability scores for the second computing node and the others of the plurality of computing nodes.

11. The system of claim 8, wherein the calculating of the reliability score for the computing node includes calculating a probability of the computing node failing within a predetermined amount of time.

12. The system of claim 8, wherein the causing of the remedial action associated with the operation of the computing node to be performed is initiated while the computing node is performing a computing task.

13. The system of claim 8, wherein the calculating of the reliability score for the computing node is performed utilizing a cognitive analysis.

14. The system of claim 8, wherein the information associated with the operation of the computing node is associated with at least one of processor faults of the computing node and memory faults of the computing node.

15. A computer program product for managing a distributed computing system, by a processor, the computer program product embodied on a non-transitory computer-readable storage medium having computer-readable program code portions stored therein, the computer-readable program code portions comprising:

an executable portion that collects information associated with operation of a computing node of a plurality of computing nodes within a distributed computing system;

an executable portion that calculates, by the computing node, a reliability score indicative of a node status for the computing node based on the collected information, wherein the calculating of the reliability score is decentralized in that each of the plurality of computing nodes within the distributed computing system computes a respective reliability score corresponding each thereto;

an executable portion that stores the node status and the calculated reliability score for each of the plurality of computing nodes within the distributed computing system in a centralized database; and an executable portion that causes a remedial action associated with the operation of the computing node to be performed based on said calculated reliability score, wherein an initial allocation of those of the plurality of computing nodes assigned to perform an incoming application having a defined priority is determined by a resource manager according to the node status and the calculated reliability score of those of the plurality of nodes identified by the resource manager from the centralized database.

16. The computer program product of claim 15, wherein the causing of the remedial action to be performed includes at least one of causing a computing task to be migrated from the computing node to a second computing node within the distributed computing system, causing a computing task being performed by the computing node to be restarted on a second computing node within the distributed computing system, causing a state of a computing task being performed by the computing node to be saved, and causing the computing node to be restarted.

17. The computer program product of claim 16, wherein the causing of the remedial action to be performed includes causing a computing task to be migrated from the computing node to a second computing node within the distributed computing system, and wherein the causing of the computing task to be migrated from the computing node to the second computing node includes calculating a reliability score for each of the second computing node and others of the plurality of computing nodes in the distributed computing system and selecting the second computing node based on the respective calculated reliability scores for the second computing node and the others of the plurality of computing nodes.

18. The computer program product of claim 15, wherein the calculating of the reliability score for the computing node includes calculating a probability of the computing node failing within a predetermined amount of time.

19. The computer program product of claim 15, wherein the causing of the remedial action associated with the operation of the computing node to be performed is initiated while the computing node is performing a computing task.

20. The computer program product of claim 15, wherein the calculating of the reliability score for the computing node is performed utilizing a cognitive analysis.

21. The computer program product of claim 15, wherein the information associated with the operation of the computing node is associated with at least one of processor faults of the computing node and memory faults of the computing node.

\* \* \* \* \*